United States Patent [19]

Day

[11] Patent Number: 4,614,055
[45] Date of Patent: Sep. 30, 1986

[54] APPARATUS FOR CONDUCTING A LIQUID TO EACH OF A PLURALITY OF TRUNKED PLANTS

[76] Inventor: Robert E. Day, Bloomfield Hills, Mich.

[21] Appl. No.: 604,227

[22] Filed: Apr. 26, 1984

[51] Int. Cl.$^4$ ............................................. A01G 13/00
[52] U.S. Cl. ......................................................... 47/2
[58] Field of Search .................... 47/2, 1.42, 1, 48.5, 47/10, 24, 25, 23, 58, 11, 12; 239/542; 47/23–25, 79–82

[56] References Cited

U.S. PATENT DOCUMENTS

| | | | |
|---|---|---|---|
| 661,898 | 11/1900 | Tucker | 47/2 |
| 1,058,566 | 4/1913 | Dunlap | 47/2 X |
| 1,442,357 | 1/1923 | Stevens | 47/58 X |
| 1,846,395 | 2/1932 | Huffaker | 47/2 |
| 1,991,851 | 2/1935 | Hammell | 47/1 X |
| 2,006,562 | 7/1935 | Scheu | 47/2 |
| 2,350,621 | 6/1944 | Kasser | 47/2 |
| 2,969,612 | 1/1961 | Loree | 47/1 |
| 3,354,579 | 11/1967 | Gross et al. | 47/2 |
| 3,521,699 | 7/1970 | Van Huisen | 47/48.5 X |
| 3,563,461 | 2/1971 | Cole et al. | 47/2 X |
| 3,738,060 | 6/1973 | Jullien-Davin | 47/81 |
| 3,757,469 | 9/1973 | Smith et al. | 47/48.5 |
| 3,890,740 | 6/1975 | Miller | 47/58 |
| 3,915,384 | 10/1975 | Diggs | 239/272 |
| 4,000,971 | 1/1977 | Gaskins | 47/24 X |
| 4,210,286 | 7/1980 | Smitherman | 47/24 X |
| 4,411,101 | 10/1983 | Springer et al. | 47/2 |
| 4,495,723 | 1/1985 | Wasserman | 47/2 |

FOREIGN PATENT DOCUMENTS

| | | | |
|---|---|---|---|
| 444859 | 10/1912 | France | 47/2 |
| 120825 | 5/1939 | Hungary | 47/24 |
| 22632 | of 1911 | United Kingdom | 47/10 |

Primary Examiner—Robert A. Hafer
Assistant Examiner—Danton DeMille
Attorney, Agent, or Firm—Cullen, Sloman, Cantor, Grauer, Scott & Rutherford

[57] ABSTRACT

A method and apparatus for servicing trunked plants such as citrus trees in which water, in heated or unheated form, is delivered by a manifold system to the base of each tree, conducted upwardly in a hose helically upwardly encircling the tree to a collar encircling the tree at an intermediate location on the trunk, and discharged from a plurality of circumferentially spaced openings in the collar and allowed to flow by gravity back down the trunk. In unheated form, the water irrigates and nourishes the tree trunk. In heated form, the water warms the tree trunk and protects the tree trunk from frost damage. The heated tree trunk and heated water will also heat the air next to the tree trunk. This heated air will rise upward and outward to heat some major branches and foliage beyond the tree trunk area.

8 Claims, 4 Drawing Figures

APPARATUS FOR CONDUCTING A LIQUID TO EACH OF A PLURALITY OF TRUNKED PLANTS

BACKGROUND OF THE INVENTION

This invention relates to methods and apparatus for heating or otherwise servicing trunked plants such for example as citrus trees.

Freeze damage to trunked plants, particularly cirtus trees, is a vexing problem for which a multitude of solutions have been proposed over the years. For example, it has been proposed to cover the trees with tents, canvas or the like to protect them from the cold. This method has proven to be generally impractical. It has also been proposed to use wind machines to stir up the air and mix the lower stratified cold air with warmer air at higher levels. This method is very expensive and has had mixed results. It has also been common to heat the grooves of citrus trees to avoid frost damage. Heating has most often been done by the use of smudge pots which form a heavy screen of dense black smoke to protect the trees. However, smudge pots are expensive to operate, ecologically offensive and often ineffective, especially in the presence of even mild winds. Attempts have also been made to protect the trees by spraying heated or unheated water on the trees during periods of low temperatures. This method has proven to be largely ineffective.

SUMMARY OF THE INVENTION

It is accordingly the object of the present invention to provide an effective and practical method and apparatus for heating or otherwise servicing trunked plants.

In the invention method, a liquid is conducted to the base of each trunked plant. The liquid is conducted up the truck of each plant to a level intermediate the base of the trunk and the top of the plant, and the liquid is allowed to flow by gravity back down the trunk of each plant. The liquid most typically is water. In unheated form the water irrigates and nourishes the plant. In heated form the water protects the plant against freeze damage.

In the apparatus of the invention the piping manifold system extends to the base of each plant and a flexible hose member is adapted to be connected at its lower end of the piping manifold system at the base of each trunk and wound helically upwardly around the trunk to dispose its upper end at a location intermediate the base of the trunk and the top of the plant. A pump and heater system is provided to selectively deliver heated or unheated liquid to the various hoses whereby to discharge heated or unheated liquid onto the trunks for gavity flow back down the trunks.

In the disclosed embodiment of the invention the upper end of each hose connects with a collar adapted to encircle the trunk. Liquid arriving at the upper end of each hose is received in the respective collar and discharged through a plurality of circumferentially spaced openings in the collar for gravity flow back down the trunk in and downwardly along the continuous helical groove defined between the hose and the trunk.

DETAILED DESCRIPTION OF THE PREFERRED EMBODIMENT

Figure 1:
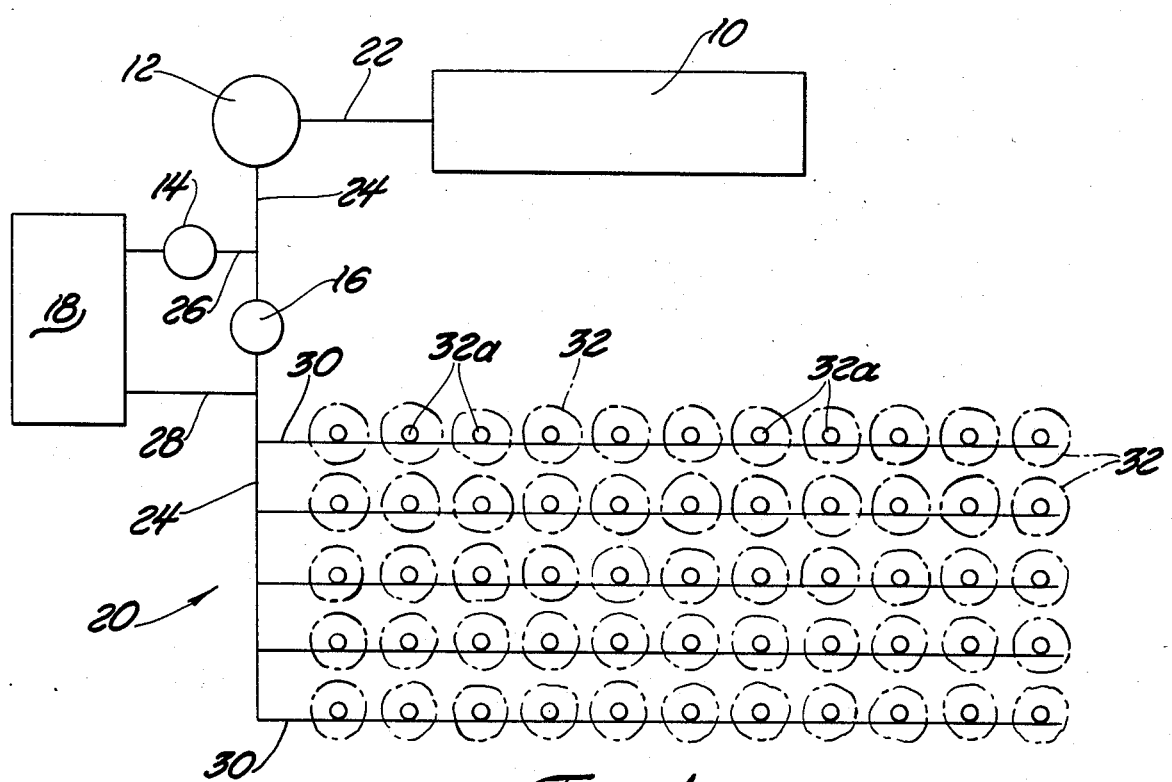
FIG. 1 is a schematic overall view of the invention apparatus.

The invention apparatus as seen in FIG. 1 includes a source of water 10, a pump 12, valves 14 and 16, a heater 18 and a piping manifold 20.

Water source 10 may take various forms and may, for example, comprise an irrigation ditch, a lake, a stream or any other source of water. Source 10 may also comprise an underground source of heated water such as an Artesian well.

Pump 12 is arranged to draw water from source 10 through a inlet pipe 22 and discharge it into an outlet pipe 24.

Heater 18 is connected to pipe 24 by a heater inlet and heater outlet pipes 26 and 28. Valve 24 is positioned in pipe 26 and valve 16 is positioned in pipe 24 between pipes 26 and 28.

Piping manifold 20 includes outlet pipe 20 and a plurality of parallel branch pipes 30. While pipes 30 may be positioned on top of or just beneath the soil surface, they are shown in the sub-surface position and extend respectively down each row of trees 32 so that a pipe 30 passes along side the trunk 32a of each tree in the orchard.

Figure 2:
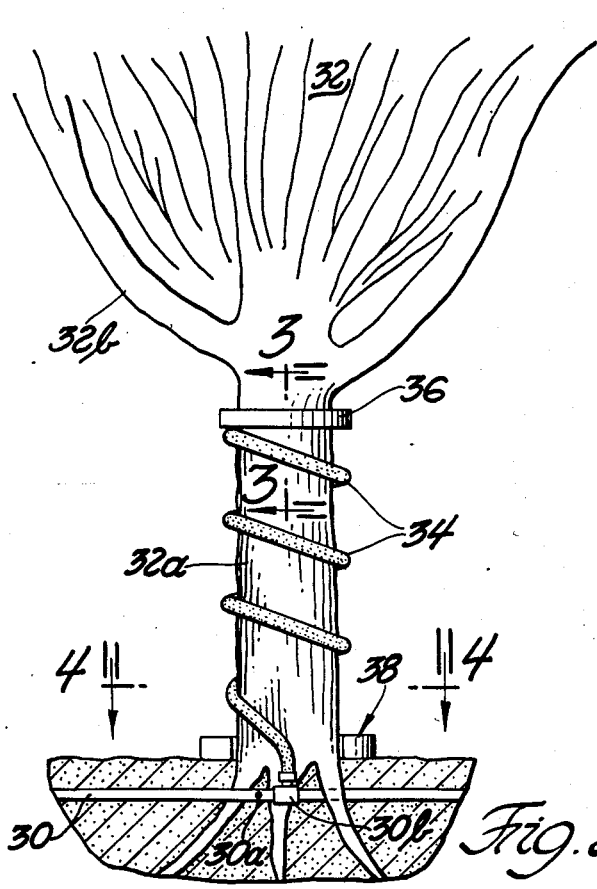
FIG. 2 is a view of the invention apparatus as applied to a single trunked plant.
Figure 3:
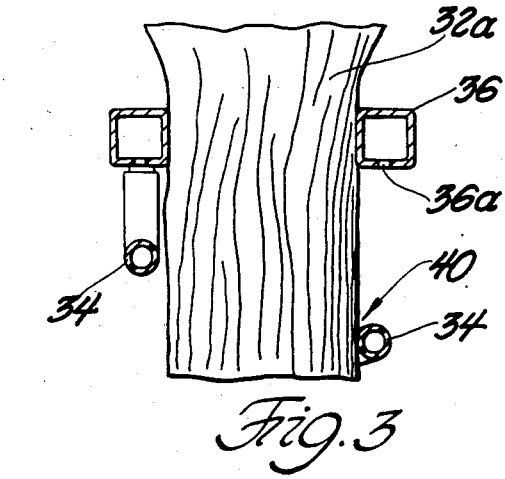
FIGS. 3 and 4 are cross-sectional views taken on lines 3—3 and 4—4 respectively of FIG. 2.
Figure 4:
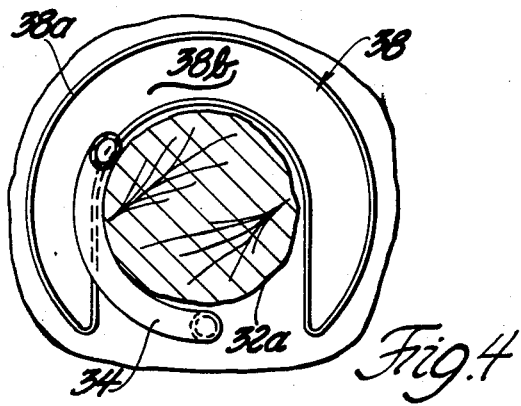

At the base of each trunk 32a, and as best seen in FIG. 2, one or more openings 30a are provided in the respective pipe 30 for purposes of irrigating the root system of the tree. Also at the base of each trunk, a hose member 34 connects beneath the soil surface at its lower end with a fitting 30b in a respective pipe 30. Hose member 34 is formed of a suitable flexible heat conductive material. Hose member 34 extends upwardly from pipe 30 and is wound helically upwardly around the trunk 32a to dispose its upper end at a location intermediate the base of the trunk and the top of the tree. The upper end of the hose member is connected by a suitable fitting to a collar 36. Collar 36 preferably encircles the tree trunk immediately beneath the first branches 32b of the tree. Collar 36 is hollow and includes a plurality of circumferentially spaced discharge openings 36a. If desired suitable metering valve devices may be provided for coaction with openings 36a to control the direction or volume of flow from the openings.

A receptacle 38 is positioned at the base of each trunk 32a. Each receptacle is horseshoe shaped so that it may be readily fitted around the base of the tree trunk, and includes a continuous side wall 38a and a base 38b. The top of the receptacle is open.

Operation. On a warm day with no threat of freezing, valve 14 is closed and valve 16 is opened so that unheated water is drawn from source 10 by pump 20 and distributed through piping manifold 20 to the base of each tree trunk. Water reaching the base of each tree trunk passes through opening 30a to irrigate the root system and passes upwardly through hose member 34 to collar 36 from where it is discharged through openings 36a for dribbling gravity flow back down the trunk of the tree to irrigate the tree trunk. Specifically, water discharged through opening 36a flows down the tree trunk until it encounters the continuous helical groove 40 defined between hose member 30 and trunk 32a whereafter the water flows at least in part downwardly along this continuous helical groove to the base of the tree where it is collected, at least in part, in receptacle 38.

If, however, freezing conditions are anticipated, valve 14 is opened and valve 16 is closed so that the output of pump 20 passes through heater 18 and heated water is supplied through piping manifold 20 to trees 32. The heated water reaching the base of each tree passes through opening 30a to irrigate the root system and passes upwardly through hose member 34 to collar 36 from where it is discharged from openings 36a for gravity flow back down the trunk along helical groove 40 for collection in receptacle 38. The described heated water flow path serves to protectively heat the tree trunk in three distinct fashions. First, the water flowing upwardly through the heat conductive hose member causes heat to pass by conduction through the wall of the hose member and into the tree trunk. Second, the heated water dribbling back down the tree trunk heats the trunk directly. And third, the residual heat in the water collected in the receptacle 38 is imparted to the tree trunk by radiation and reflection. The net effect of the described heated water flow is to effectively heat the tree trunk and protect it from freeze damage even under very severe conditions.

As indicated earlier, the water source 10 may be an irrigation ditch, a lake, stream or the like. In some geographical locations, the temperature of such water is often quite high, such as 50 to 70 degrees F., due to natural conditions and in spite of freezing ambient conditions. Thus, if the freezing or frost conditions are not too severe, the heaf of water in the source will be sufficient to protect the trunks of the plants without requiring use of heater 18.

The invention thus provides a method and apparatus whereby trunked plants, under normal conditions, may be effectively irrigated or otherwise serviced and whereby the same plants, under adverse conditions, may be effectively protected from freeze demage.

Whereas a preferred embodiment of the invention has been illustrated and described in detail, it will be apparent that various changes may be made in the disclosed embodiment without departing from the scope or spirit of the invention. For example, and as previously indicated, it may be possible in some situations to tap into natural sources of heated underground water in which event the disclosed heater system could be eliminated or could be used as a supplemental heating system in the event that the water temperature of the underground natural source was inadequate.

The embodiments of the invention in which an exclusive property or privilege is claimed are defined as follows:

1. An apparatus for use in conducting a liquid to each of a plurality of trunked plants, said apparatus comprising:
    A. a plurality of flexible hose members each adapted to be connected at its lower end to a source of liquid at the base of a respective trunk and wound helically upwardly around that trunk to dispose its upper end at a location intermediate the base of the trunk and the top of the plant; and
    B. a plurality of collar members each adapted to encircle a respective trunk at such intermediate location thereon and each having a fitting for connection with the upper end of a respective hose member and a plurality of circumferentially spaced discharge openings operative to discharge liquid delivered to the collar through the respective hose member onto the trunk for gravity flow back down the trunk in intimate wetting contact with the exterior surface of the trunk.

2. An apparatus according to claim 1 and further including:
    C. a plurality of receptacles each adapted to be positioned at the base of a respective trunk to catch the liquid flowing back down the trunk from the respective collar and allow any heat left in the liquid to radiate or reflect to the trunk.

3. An apparatus according to claim 2 wherein:
    D. each said receptacle is horseshoe shaped so as to readily slip around the trunk at the base of the trunk.

4. An apparatus for conducting a liquid to each of a plurality of trunked plants, said apparatus comprising:
    A. a source of liquid;
    B. piping manifold means communicating said source to the base of each plant;
    C. a plurality of hose members each connected to its lower end to said piping manifold means at the base of a respective trunk and extending upwardly with respect to that trunk to dispose its upper end at a location intermediate the base of the trunk and the top of the plant; and
    D. means at said upper endof each of said hose members defining liquid discharge means operative to discharge liquid flowing upwardly through said hose member onto the respective trunk at said intermediate location for gravity flow downa the trunk in intimate wetting contact with the exterior surface of the trunk;
    E. each of said hose members is flexible and wound helically upwardly around its respective trunk whereby at least a portion of the liquid discharged onto the trunk at said intermediate location flows down the trunk in and downwardly along the continuous helical groove defined between the hose and the trunk; and
    F. mounting means provided for maintaining the upper end of each hose member at said intermediate location on the trunk; and
    G. said mounting means and said discharge means for each hose member comprises a collar for the respective plant adapted to encircle the respective trunk at said intermediate location and having a fitting for receipt of the upper end of a respective hose member and a plurality of circumferentially spaced discharge openings, whereby the liquid arriving at the upper end of the hose member is received in a respective collar and discharged through said plurality of discharge openings for gravity flow back down the trunk.

5. An appartus for conducting a liquid to each of a plurality of trunked plants, said apparatus compising:
    A. a pump adapted to be connected to a source of liquid;
    B. a heater capable of heating said liquid;
    C. a piping manifold system adapted to extend to the base of each plant;
    D. valving means operative to selectively:
        1. direct unheated liquid directly from said pump to said piping manifold system, whereby to deliver unheated liquid to the base of each plant, and
        2. direct liquid from said pump to said heater and thence to said piping manifold system, whereby to deliver heated liquid to the base of each plant;
    E. a plurality of flexible hose members each adapted to be connected at its lower end to said piping manifold system at the base of a respective trunk and be wound helically upwardly around that trunk to dispose its upper end at a location intermediate the base of the trunk and the top of the plant;

F. means for maintaining the upper end of each hose member at said intermediate location on the respective trunk; and G. means at said upper end of each of said hose members defining liquid discharge means operative to discharge heated or unheated liquid flowing upwardly through said hose member onto the trunk at said intermediate location for gravity flow back down the trunk in and downwardly along the continuous helical groove defined between the hose and the trunk.

6. An apparatus according to claim 5 wherein:

H. said maintaining means and said discharge means comprise a collar for each tree adapted to encircle a trunk at said intermediate location and having a fitting for receipt of the upper end of a respective hose member and a plurality of circumferentially spaced discharge openings, whereby the liquid arriving at the upper end of the hose member is received in a respective collar and discharged through said plurality of discharge openings for gravity flow back down the trunk.

7. An apparatus according to claim 6 wherein:

I. said apparatus further includes a receptacle for each trunk adapted to be positioned at the base of each trunk to catch the liquid flowing back down the trunk and allow any heat left in the liquid to radiate or reflect to the trunk.

8. An apparatus according to claim 7 wherein:

J. each said receptacle is horseshoe shaped so as to readily slip around the trunk at the base of the trunk.

* * * * *